June 21, 1966  C. A. SIVER  3,257,095
VALVE CONSTRUCTION PARTICULARLY PACKED OR SEALED
Original Filed Dec. 12, 1962  5 Sheets-Sheet 1

INVENTOR.
CHESTER A. SIVER
BY
ATTORNEY.

June 21, 1966 C. A. SIVER 3,257,095
VALVE CONSTRUCTION PARTICULARLY PACKED OR SEALED
Original Filed Dec. 12, 1962 5 Sheets-Sheet 2

INVENTOR.
CHESTER A. SIVER
BY
ATTORNEY.

June 21, 1966    C. A. SIVER    3,257,095
VALVE CONSTRUCTION PARTICULARLY PACKED OR SEALED
Original Filed Dec. 12, 1962    5 Sheets-Sheet 4

INVENTOR.
CHESTER A. SIVER
BY
ATTORNEY

June 21, 1966     C. A. SIVER     3,257,095
VALVE CONSTRUCTION PARTICULARLY PACKED OR SEALED
Original Filed Dec. 12, 1962     5 Sheets-Sheet 5

INVENTOR.
CHESTER A. SIVER
BY
ATTORNEY.

United States Patent Office 3,257,095
Patented June 21, 1966

1

3,257,095
VALVE CONSTRUCTION PARTICULARLY
PACKED OR SEALED
Chester A. Siver, Longmeadow, Mass.
(10 Fair Hill Lane, Suffield, Conn.)
Original application Dec. 12, 1962, Ser. No. 244,092.
Divided and this application Dec. 9, 1963, Ser. No. 328,901
13 Claims. (Cl. 251—214)

The present invention relates to valves, and more specifically to improvements in valves for high-pressure and/or high-temperature fluids.

This application is a division of copending application Serial Number 244,092, filed December 12, 1962.

High-pressure globe valves heretofore most widely employed generally have required costly and time-consuming procedures for their assembly and disassembly. The bulk of such valves have a multiplicity of elements which are fastened together and many require a weldment to ensure safe assembly during operation which must be broken for disassembly. Moreover, the repacking of such valves while in service has been a tedious and/or somewhat hazardous practice. Additionally, the manufacture of the assembly and/or replacement of elements generally has been costly and relatively difficult because of the number of parts involved and the means of interengagement.

It is an object of the present invention to provide a valve for high-pressure and/or high-temperature fluids which can be easily and quickly assembled and disassembled for repair and replacement of components.

Another object is to provide such a valve which is free from risk of accidental disassembly and rugged in construction.

It is also an object to provide such a valve having relatively few components which interrelate and cooperate in a novel manner to minimize problems in assembly and disassembly and to provide a long-lived construction.

A specific object is to provide a novel and highly effective bonnet assembly permitted facile and speedy removal of a bonnet packing cartridge.

Another specific object is to provide a clamp yoke and bonnet construction which is speedily and easily assembled or disassembled to provide secure interengagement with the valve body.

Other objects and advantages will be apparent from the following detailed description and the attached drawings wherein.

2

It has now been found that the foregoing and related objects may be readily attained in a valve assembly including a valve body having a valve chamber communicating with a through flow passage, a clamp yoke removably but firmly engaged with the valve body, a valve stem reciprocable relative to the clamp yoke within the valve chamber, sealing means reciprocable by the valve stem for sealing the through flow passage, and a bonnet assembly covering the outer end of the valve chamber with a bonnet packing cartridge portion at the outer end thereof.

The bonnet assembly is held in locked relationship with the valve body by the clamp yoke and is readily removable upon removal of the clamp yoke from the valve body.

The inner end of the bonnet assembly projects into the valve chamber and annular pressure sealing means are provided between the bonnet assembly and the inner wall of the valve body defining the valve chamber to provide a pressure-tight seal therebetween. Packing means are received within an axial recess in the bonnet packing cartridge portion and disposed about the stem extending therethrough, and a gland extends about the stem outwardly of the packing means. The gland is adjustably linked to the yoke for compressing the packing means into the bonnet packing cartridge portion, preferably by threaded engagement of the gland with a bushing member in the yoke. Thus, the bonnet assembly and any separate sealing means are readily removable and replaceable upon disengagement of the clamp yoke from the valve body. In the preferred embodiment, the inner end of the bonnet assembly provides a back-seat portion for cooperation with the valve sealing means to provide a seal in the open position of the valve.

The clamp yoke has a split ring portion adjacent its lower end which threadably engages the valve body and a clamp bolt generally tangentially transversing the split draws the ring sections separated by the split tightly together to lock the ring tightly onto the valve body. The clamp yoke also has an upper portion and intermediate yoke arm portions connecting the upper and split ring portions. The clamp yoke is provided with a radially inwardly extending bonnet retaining flange which engages with a radially outwardly extending flange at the outer portion of the bonnet assembly to conveniently hold the bonnet assembly in locked engagement with the valve body. By loosening the clamp bolt, the yoke may be rapidly removed from the valve body, thereby releasing the bonnet assembly for removal or replacement thereof and for replacement of any separate annular sealing means employed between the body and bonnet assembly.

In the preferred embodiment, the bonnet assembly has a metallic bonnet portion providing the cartridge portion and a back-seat portion which is separately and integrally formed of a hard wear-resistant metallic alloy. The back-seat portion is annular and has a circumferential, generally conical seating surface at its inner end inclined outwardly towards the clamp yoke which is dimensioned and configured to cooperate with an annular back-seat sealing lip on the valve sealing means having an inner periphery with a generally conical seating surface portion. The annular back-seat portion provides a wear-resistant stem guide surface for the valve stem which extends therethrough and is most desirably secured to the bonnet portion securely but without distortion, particularly by an electron beam weldment.

Although separate annular sealing means may be interposed between the valve body wall and the bonnet assembly, the most desirable construction utilizes cooperatively configured and dimensioned generally conical sealing surfaces on the two elements. In accordance with the preferred embodiment, the bonnet assembly has an axially inwardly extending annular lip portion extending about the periphery of the lower end thereof with a generally conical sealing surface portion extending circumferentially about the outer surface thereof and tapering to a reduced diameter at the inner end thereof. The inner wall of the valve body has a cooperating sealing surface portion of generally conical configuration extending about the periphery thereof and tapering inwardly to a reduced diameter. The angle of taper of the sealing lip portion relative to the axis of valve stem reciprocation is normally less than the angle of taper of the valve body sealing surface so that the lip portion is transversely deflected into stressed fluid-tight sealing engagement with the sealing surface by movement of the bonnet assembly inwardly of the valve body and the lip portion is transversely deflected against the sealing surface by fluid pressure about the inner periphery thereof to enhance the sealing engagement therebetween.

Turning now to the attached drawings in detail, FIGURES 1–5 illustrate a valve assembly embodying the present invention comprising a valve body 2 having end ports 4 and 6 joined by through flow passage 8. The valve body 2 has a bonnet end extension portion 12 extending at an angle to the flow passage 8 and having a valve chamber 14 extending therethrough which communicates wtih the through flow passage 8. An annular valve seat ring 10, preferably of a hard wear-resistant metallic alloy, such as Stellite alloys made by the Haynes Stellite Division of Union Carbide Corporation, is secured in the through flow passage 8, preferably by an electron beam weldment.

Figures 1, 2, 3, 4, 5:
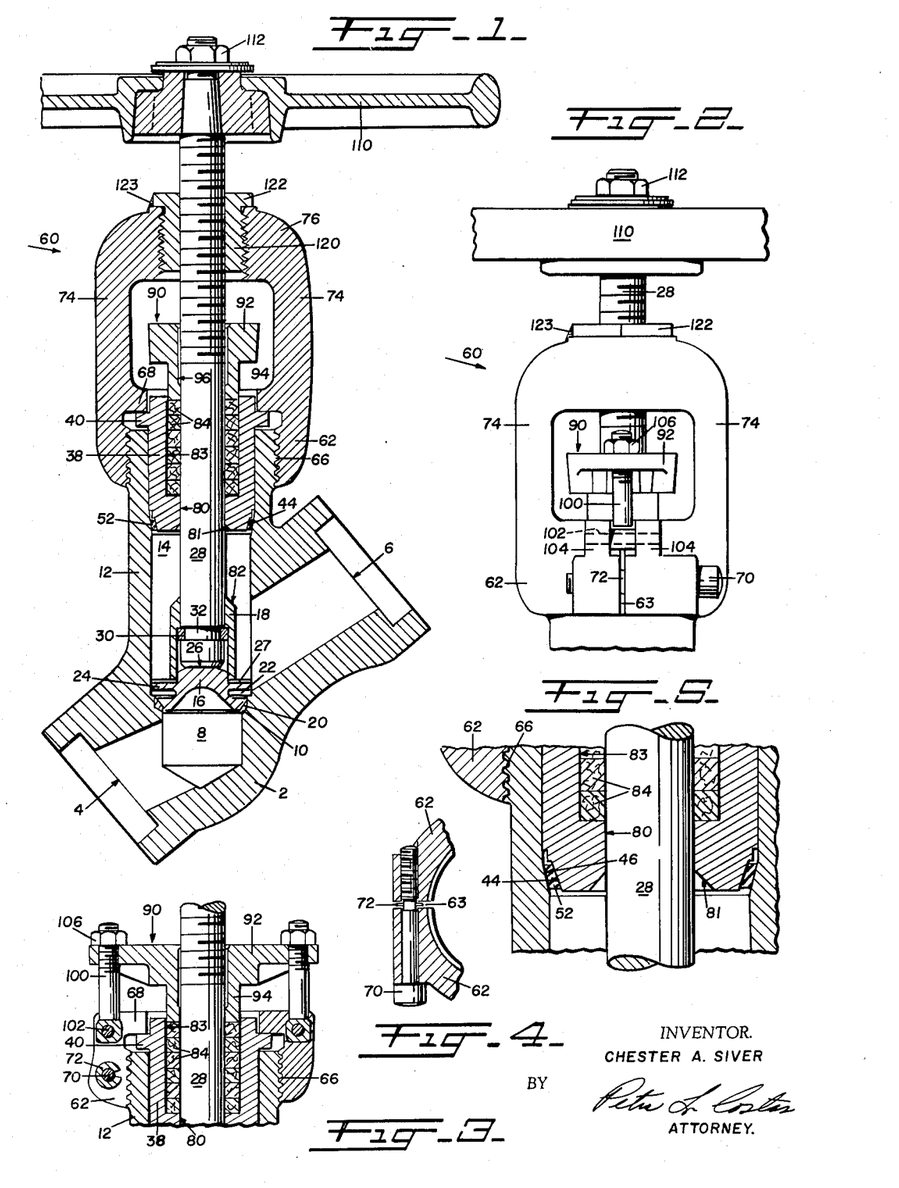
FIGURE 1 is a sectional view in elevation of a valve embodying the present invention.
FIGURE 2 is a fragmentary elevational view of the valve of FIGURE 1.
FIGURE 3 is a fragmentary sectional view of the valve of FIGURE 1 taken at a right angle thereto.
FIGURE 4 is a fragmentary cross-sectional view illustrating a portion of the clamping structure of the clamp yoke.
FIGURE 5 is a fragmentary sectional view to an enlarged scale of the bonnet packing cartridge seal portion of the valve of FIGURE 1.

The valve stem 28, which is reciprocable axially within the valve chamber 14, is provided at its inner end with means for sealing the through flow passage 8 including the valve disc member 16. The generally annular disc securing member 18 secures the valve disc 16 to the stem 28 with the end thereof bearing against the thrust surface 26 of the disc 16. The valve disc 16 preferably is integrally formed of a hard wear-resistant metallic alloy and has a circumferential seating surface 20 cooperating with valve seat ring 10 to form a seal in the through flow passage 8. The valve disc 16 also has a peripheral recess 22 for effecting a saving in weight and material and a peripherally extending guide flange portion 24 spaced axially from the seating surface 20. The upper surface of the flange portion 24 is provided with tool-engaging slots 27 for engagement by a tool inserted into the outer end of the chamber 14 to rotate the disc 16 during lapping. The disc-securing member 18 is secured to the disc 16, preferably by an electron beam weldment and is secured to the inner end of the valve stem 28 by the split ring 30 seated in the groove 32 in the valve stem 28 which abuts against an inner radially extending, annular shoulder. The disc retaining member also has a generally conical back-seat sealing surface 82 at its outer end for a purpose to be described hereinafter.

Threadably engaged upon the outer surface of the bonnet end extension portion 12 of the valve body 2 is the clamp yoke 60 having a lower split ring portion 62 and an upper ring portion 76 joined by a pair of vertical yoke arms 74. The lower split ring portion 62 has a threaded axial aperture 66 therethrough which threadably engages with threads on the bonnet end extension portion 12. When the clamp yoke 60 has been drawn down sufficiently upon the valve body 2, the clamp yoke bolt 70, tangentially traversing the split 63 in the split ring portion 62, is tightened to close the gap or split 63 and draw the split ring portion 62 tightly about the valve body 2, thereby quickly but firmly locking or clamping the clamp yoke 60 to the valve body 2. As seen in FIGURES 2 and 4, the snap ring 72, which is held within the split 63 by the bolt 70, expands upon loosening of the bolt 70 to aid in widening the split 63 upon disassembly and thus to facilitate the removal of the clamp yoke 60 from the valve body 2. The lower split ring portion 62 also has two diametrically spaced pairs of lugs or bosses 104, and an inwardly radially projecting bonnet retaining flange 68 spaced above the threaded portion 66, all for purposes to be described hereinafter.

The upper ring portion 76 has a threaded aperture therein threadably seating the generally annular yoke bushing 120 which is tightened therein until the flange 122 thereon abuts against the upper surface of the upper ring portion 76. To lock the bushing 120 against inadvertent rotation relative to clamp yoke 60, a tack weld is desirably provided as indicated by the numeral 123.

The central aperture through the annular bushing 120 is threaded for adjustable engagement with the threaded upper portion of the valve stem 28. Rotation of the hand wheel 110, which is locked upon the upper end of the valve stem 28 by the lock nut 112, causes the valve stem 28 to reciprocate axially relative to the bushing 120 and thereby the valve body 2 and the through flow passage 8 in opening and closing the valve.

The outer end of the valve chamber 14 is covered by a bonnet assembly 38 having a bonnet packing cartridge portion with an axially extending cylindrical recess 83 opening at the outer end thereof and a generally conical bonnet sealing surface portion 44 extending circumferentially about its inner end and tapering inwardly to a reduced diameter at the innermost end. The inner wall of the bonnet end extension 12 defining the valve chamber 14 has a cooperatively configured and dimensioned, generally conical sealing surface portion 46 similarly tapering to the reduced diameter at its inner end. The bonnet assembly sealing surface portion 44 has an angle of taper relative to the axis of reciprocation of the valve stem 28 slightly greater than the corresponding angle of taper of the generally conical bonnet sealing surface 46 to provide an annular gap therebetween diverging inwardly of the valve chamber 14. An annular float ring seal or gasket 52 of suitable elastically deformable material is wedged in the annular gap during the seating of the bonnet assembly 38. Fluid pressure within the valve chamber 14 tends to force the float ring seal 52 even more tightly into the annular gap to provide an excellent high-pressure seal between the bonnet assembly 38 and the valve body 2.

The bonnet assembly 38 also has a back-seat portion at its inner end with an annular, generally conical seating surface 81 dimensioned and configured to cooperate with the aforedescribed seating surface 82 on disc securing member 18 to provide a seal about the valve stem opening 80 in the bonnet assembly 38 when the valve is opened.

The bonnet assembly 38 also is provided with a radially outwardly extending annular flange 40 adjacent the outer end thereof which is tightly clamped between the upper surface of the bonnet end extension 12 of the valve body 2 and the radially inwardly extending bonnet retaining flange 68 on clamp yoke 60 during the lowering of yoke 60 upon the valve body 2 to lock the bonnet assembly onto the valve body 2. Thus, the bonnet assembly 38 may be rapidly and easily removed from or engaged with the valve body 2 by the facile and speedy removal or engagement of the clamp yoke 60 upon the valve body 2. The axially extending cylindrical recess 83 of the bonnet packing portion of the bonnet assembly 38 receives packing material such as the packing rings 84 which provide an annular seal about the valve stem 28 as it extends therethrough.

Slidably mounted on the valve stem 28 upwardly of the bonnet assembly 38 is a gland 90 having a cylindrical bushing portion 94 of reduced diameter at its lower end dimensioned to fit snugly within the recess 83. The axial aperture 96 in the gland 90 through which the valve stem 28 projects should be dimensioned sufficiently larger to minimize any binding forces upon the stem 28 and desirably has its outer portion of enlarged diameter to minimize the likelihood of possible galling or locking upon the threaded portion of the stem 28. Adjacent its outer end, the gland 90 has a radially outwardly extending flange 92 with diametrically opposed extension portions or ears which extend radially outwardly above the aforementioned bosses 104 of the lower split ring portion 62, as best seen in FIGURE 3. A pair of gland bolts 100 are pivotally mounted at their lower ends on gland bolt pins 102 which, in turn, are journaled between the pairs of bosses 104. The gland bolts 100 extend freely upwardly through apertures in the extension portions of gland flange 92 and gland bolt nuts 106 are tightened upon the bolts 100 to urge the gland bushing portion 94 into the recess 83 of the bonnet assembly 38 and thus to compress the material of the packing rings 84 about the valve stem 28 in the recess 83. In this manner, the bolt nuts 106 may be "walked down" substantially uniformly upon their respective gland bolts 100 to effect the desired inward movement of the gland 90.

Figures 6, 7:
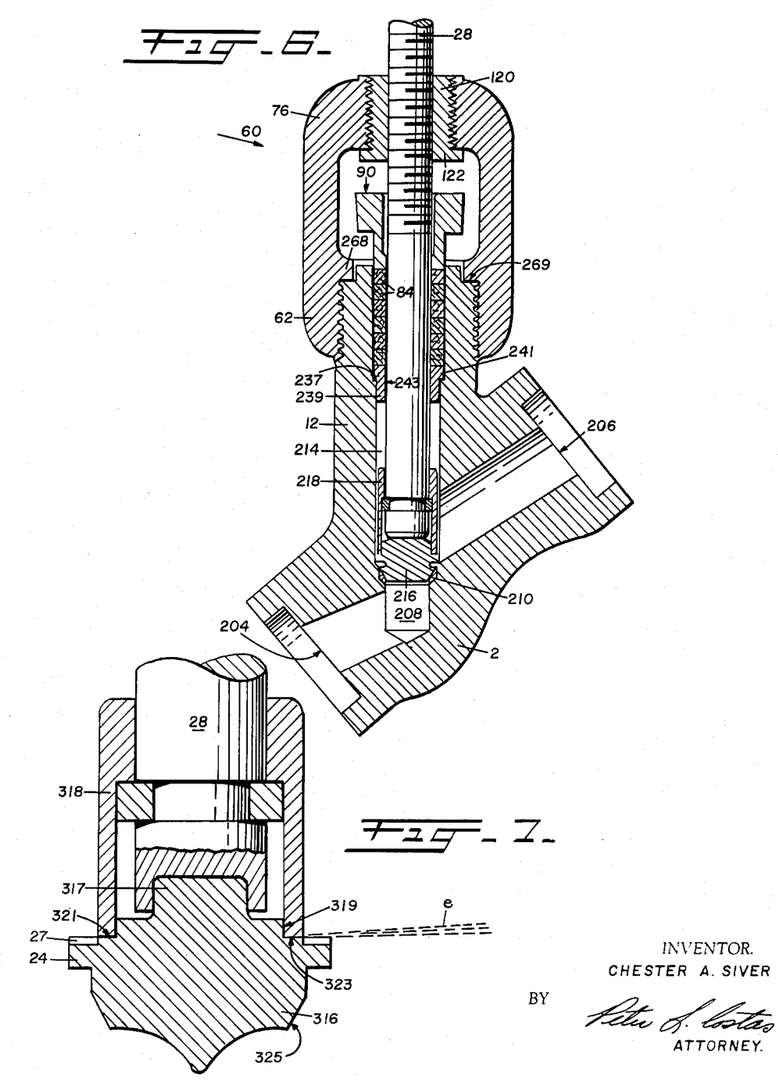
FIGURE 6 is a sectional view in elevation of another valve embodying the present invention.
FIGURE 7 is a sectional view of another embodiment of sealing means reciprocable by the valve stem.

Turning now to FIGURE 6, therein is illustrated an alternate bonnet and yoke bushing construction in a valve assembly having a valve body 2 similarly having end ports 204, 206 connected by through flow passage 208 and a bonnet end extension portion 12 with a valve chamber 214 communicating with the through flow passage 208 in which is secured a seat ring 210. As in the previous embodiment, the valve stem 28 reciprocates within the valve chamber 214 and has mounted on its inner end sealing means including a valve disc member 216 adapted to form a sealing engagement with valve seat ring 210 and secured to the valve stem 28 by disc securing member 218.

In this embodiment, the valve chamber 214 is covered by the loose back-seat and bonnet member 239 which is entirely disposed within the valve chamber 214 and has a radially outwardly extending shoulder 241 engaged with the radially inwardly extending annular shoulder 237 on the inner wall of the valve body 2 defining the valve chamber 214 to limit its inward movement. Bonnet member 239 is provided with axial aperture 243 through which the valve stem 28 reciprocates and packing rings 84 of suitable material are received within the valve body 2 outwardly of the back seat member 239.

Clamp yoke 60 is threadably engaged with valve body 2 as described hereinbefore, with the radially inwardly projecting flange 268 engaging the annular shoulder 269 on valve body 2 to limit the movement of yoke 60 onto the body. Gland 90 is adjustably secured to the yoke 60 as described for the embodiment of FIGURES 1–5 to compress the packing rings 84 against the loose back seat member 239. In this embodiment, the yoke bushing 120 is inverted with the radially outwardly extending flange portion 122 bearing against the inner surface of upper ring portion 76 of yoke 60. In this manner, the flange transmits to the upper abutting surface of the ring portion 76 of the clamp yoke 60 substantially the full load of the thrust developed in reciprocating the valve stem 28 inwardly to close the valve, thus relieving the threads of bushing 120.

Although the back-seat 239 may be welded to the wall of the valve body 2 or threadably engaged therewith, the loose arrangement illustrated will be generally satisfactory for intended applications. It will be readily appreciated that the loose back-seat of this embodiment does not permit repacking under pressure as in the previous embodiment.

FIGURE 7 illustrates in detail an alternative disc structure wherein the disc 316 is positively aligned with the valve stem 28 and the technique of electron beam welding which is most desirably employed. In this embodiment, the disc 316 has a sealing surface 325 at its inner end and an axially extending cylindrical portion 317 at its outer end which snugly seats within a complemental axial recess in the inner end of valve stem 28, thereby centering the disc 316 upon the valve stem 28 and substantially preventing rocking therebetween. Disc retaining member 318 similarly encompasses shoulder 319 of disc 316 and disc surface 321 is conveniently welded to retaining member surface 323 by electron beam welding as indicated by the rays $e$. A disc guide flange 24 and tool engagement means 27 are also provided.

Figure 8:
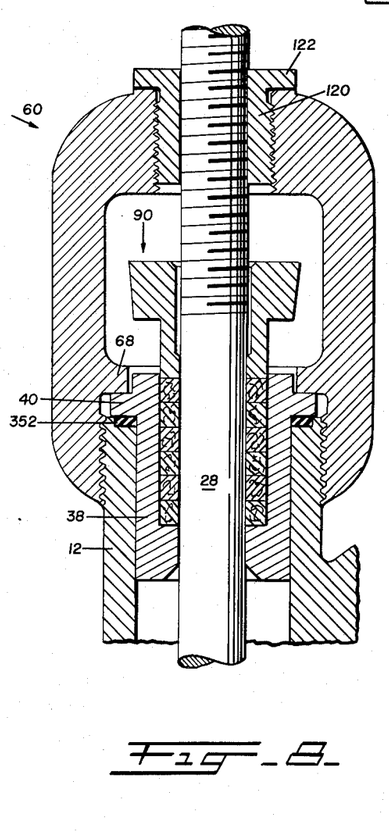
FIGURE 8 is a fragmentary sectional view in elevation of an alternate embodiment of clamp yoke and bonnet assembly of the present invention.

In the embodiment of FIGURE 8, there is illustrated an alternative pressure sealing means between the bonnet assembly or bonnet packing cartridge 38 and the bonnet end extension portion 12 of the valve body 2 wherein an annular gasket or sealing ring 352 is seated within an annular recess in the surface of the outer end of the bonnet end extension 12. As the clamp yoke 60 is threaded onto the valve body, the bonnet retaining flange 68 bears down upon the bonnet flange 40 which comprises the gasket 352 to form a high-pressure fluid-tight seal. Desirably, the gasket 352 is of the spiral-wound type made of various ferrous and non-ferrous metals and may include various fillers such as asbestos, rubber, fiber, plastic or the like as suitable for encountered high-temperature conditions.

Figure 9:
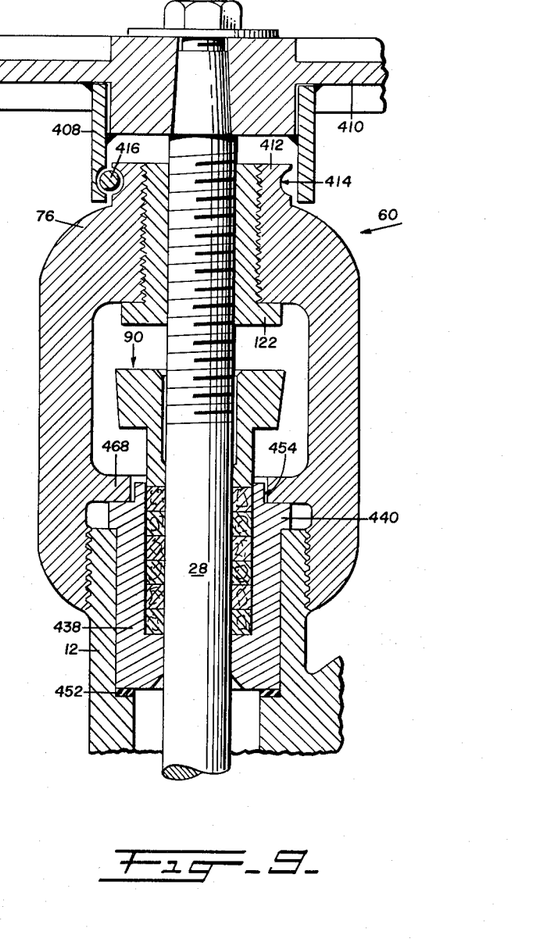
FIGURE 9 is a fragmentary sectional view in elevation of yet another embodiment of the clamp yoke and bonnet assembly of the present invention.

In the embodiment of FIGURE 9, there is illustrated still another pressure sealing means between bonnet packing cartridge 438 and bonnet end extension 12 wherein an annular gasket 452, similar to the gasket 352 of FIGURE 8, is placed between the inner end of the bonnet assembly 438 and a radially extending annular shoulder on the inner wall of bonnet end extension 12 formed by a change in diameter of the valve chamber 14. As the clamp yoke 60 is threaded upon the valve body, the bonnet retaining flange 468 thereof seats in the annular peripheral recess 454 in the outer end of cartridge 438 against the flange 440, driving the bonnet assembly inwardly and compressing the gasket 452 until flange 440 abuts against the upper surface of bonnet end extension 12. By providing the pressure sealing means at the inner end of the bonnet assembly, the portion of the bonnet end extension 12 above the seal need not be designed to withstand the high internal pressures occurring in the valve chamber as required in the case of the embodiment of FIGURE 8.

The embodiment of FIGURE 9 also illustrates means for locking the handwheel 410 in a desired adjusted position including an annular skirt 408 welded to the handwheel 410 and depending therefrom about a cylindrical projection 412 extending axially outwardly from the upper ring 76 of clamp yoke 60. Cylindrical projection 412 has a circumferential recess 414 therein, and the inner surface of skirt 408 has a generally tangential recess therein registering with the recess 414 and openings through the wall thereof at the ends of the recess therein. A rod-like member 416 extends tangentially through the openings in the skirt 408 and the complementary recesses and is provided with suitable locking elements (not shown) outwardly of the skirt 408 to lock the handwheel 410 against rotation with respect to the yoke 60 and conveniently is one leg or bail of a padlock.

Figures 10, 11:
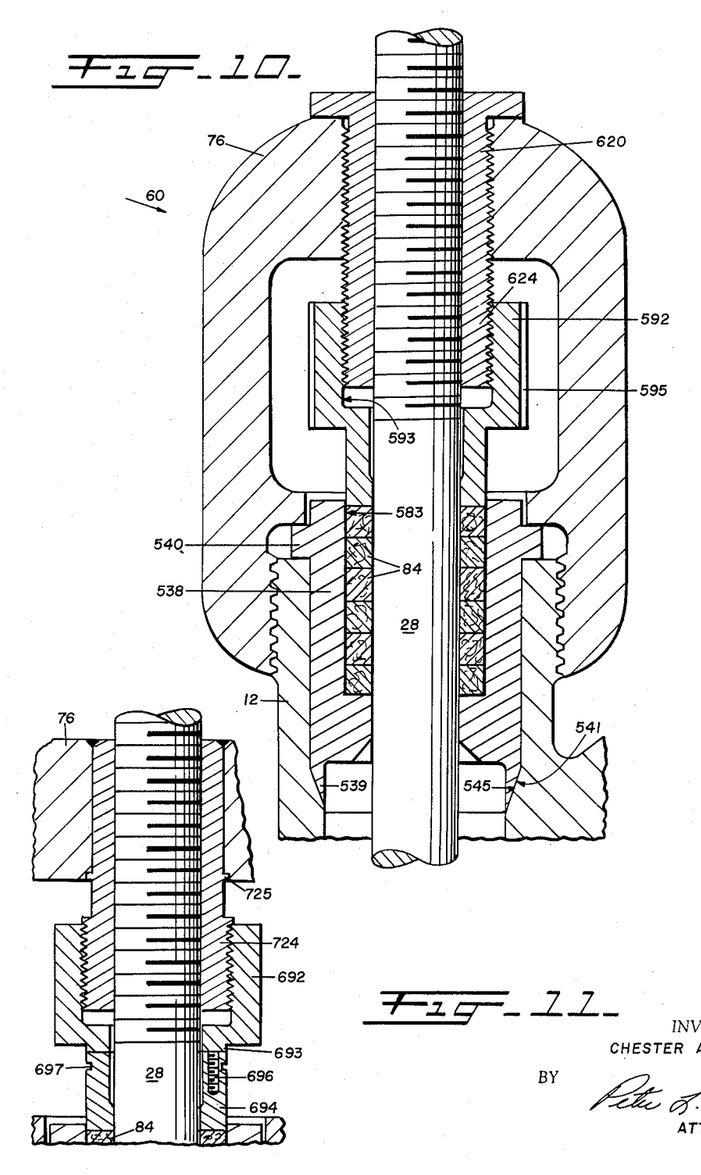
FIGURE 10 is a sectional view in elevation and to an enlarged scale of a further embodiment of the clamp yoke and bonnet assembly of the present invention.
FIGURE 11 is a fragmentary sectional view in elevation of a modified gland assembly for use in a valve embodying the present invention.

Referring now to the embodiment of FIGURE 10, therein is illustrated the preferred sealing means between the bonnet assembly 558 and valve body 2 and a desirable gland adjusting means. The inner end of the bonnet assembly or bonnet packing cartridge 538 is provided with a depending annular bonnet sealing lip 539 having a generally conical bonnet sealing surface 541 on its outer periphery tapering to a reduced diameter at the inner end. The inner wall of the bonnet end extension 12 defining the valve chamber 14 is cooperatively configured to provide a generally conical sealing surface 545. The angle of taper of the bonnet sealing surface 541 relative to the axis of reciprocation of the valve stem 28 normally is slightly less than the corresponding angle of taper of the body sealing surface 545. As the clamp yoke is tightened upon the valve body 2, it bears upon the cartridge flange 540, driving the bonnet assembly 538 inwardly. As the sealing lip 539 is pressed against body sealing surface 545 by its movement inwardly of the valve chamber 14, it is deflected radially inwardly within the elastic limit of the metal thereof so that the bonnet seating surface 541 thereof enters into stressed, fluid-tight sealing engagement with the body sealing surface 545. During operation of the valve, the sealing lip 539 is transversely or radially deflectable against the sealing surface 545 by pressure of fluid against the inner peripheral surface thereof to enhance the sealing engagement of sealing surface 541 against sealing surface 545. The cartridge flange 540 abuts against the upper surface of bonnet and extension 12 to limit inward movement of the cartridge 538 and prevent overdeflection of the sealing lip 539. Bonnet packing cartridge 538 also is provided with an axial recess 583 for receiving packing rings 84.

Although the bonnet sealing lip 539 in the illustrated embodiment is indicated as an integral portion of the bonnet assembly or cartridge 538, it may desirably be provided as a separately formed element, conveniently as a part of a back-seat portion, which is bonded to a separately formed cartridge portion. Thus, a hard, wear-resistant metallic alloy may be employed for the sealing lip 539 to prevent galling and the separate portions preferably may be secured by electron beam welding.

Threadably received in upper ring 76 of clamp yoke 60 is a yoke bushing 620 which is elongated to provide an externally threaded extension 624 inwardly of the ring 60. Adjustably mounted upon the extension 624 is the gland 592 with its threaded bore 593 and axial splines or tool-engaging recesses 595 in its outer periphery by which a tool such as a spanner wrench may turn the gland 592 for axial reciprocation upon the bushing extension 624 for compression of the packing rings 84.

In the embodiment of FIGURE 11, there is illustrated a modification of the gland structure of FIGURE 10 wherein the gland body 692 is threadedly mounted upon the yoke bushing extension 724 and has a depending circular boss 693 which drives inwardly a separate gland bushing 694. In this embodiment, the gland bushing 694 is substantially prevented from rotation relative to the packing rings 84 by the relatively great friction therebetween as contrasted with the lesser friction between the opposed metallic surfaces of the gland components, thus minimizing wear of the rings 84. Gland bushing 694 may be provided with a tapped opening 696 or a groove 697 to facilitate extraction from the axial recess of the bonnet assembly or cartridge.

In a manner and purpose similar to that of the embodiment of FIGURE 9, the yoke bushing has a radially outwardly extending peripheral flange 725 thereon which seats in a recess in the inner surface of upper yoke ring 76 to absorb upward thrusts of the valve stem 28.

Figure 12:
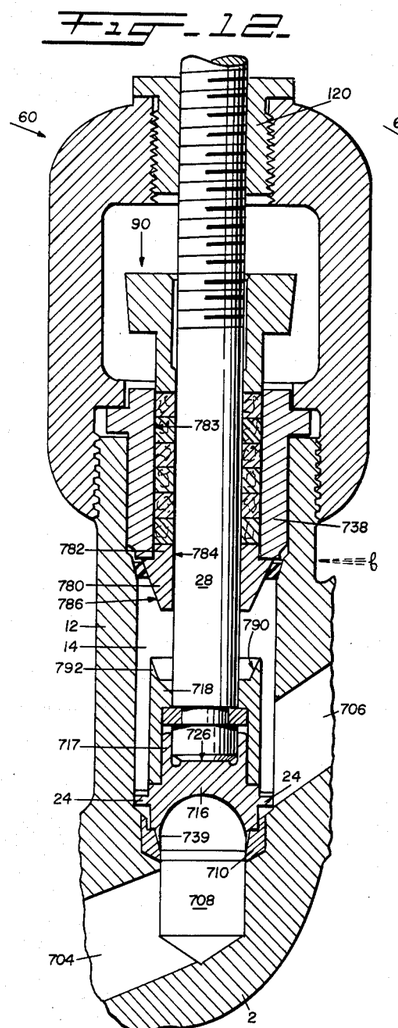
FIGURE 12 is a fragmentary sectional view in elevation of still another embodiment of a valve assembly of the present invention with the valve stem in closed position.
Figure 13:
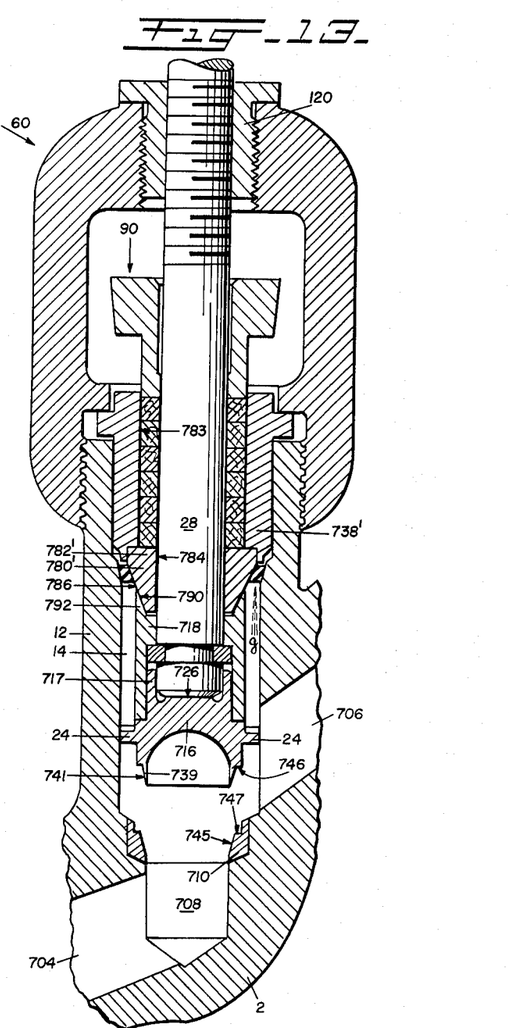
FIGURE 13 is a fragmentary sectional view in elevation of a valve assembly generally similar to that of FIGURE 12 with the valve stem in closed position.

Turning now to the embodiment of FIGURES 12 and 13, therein are illustrated valves having an alternative bonnet assembly construction providing a separately formed back-seat portion cooperating with the disc securing member to provide a highly effective seal as well as a preferred valve disc and seat ring construction. The body 2 similarly has end ports 704, 706 connected by the through flow passage 708 in which is seated the valve seat ring 710. The inner end of the valve stem 28 seats within the stem receiving axial recess defined by stem guide portion 717 and stem thrust surface 726 in the outer end of the valve disc 716. At its inner end, the valve disc 716 is provided with an annular sealing lip 739 having a generally conical sealing surface 741 extending circumferentially about the outer periphery thereof which makes surface contact with generally conical sealing surface 745 of valve seat ring 710 to seal the through flow passage 708. The angle of taper of the disc sealing surface 741 relative to the axis of reciprocation of the valve stem 28 is normally slightly less than that of the ring sealing surface 745 to produce radial or transverse deflection upon movement thereagainst and thereby provide stressed, fluid-tight sealing engagement therebetween. This is enhanced by pressure of fluid acting against the inner peripheral surface of the lip 39. To limit the inward movement of the valve disc 716 and thereby avoid excessive deflection, the disc has a radial shoulder 746 which abuts against a radial shoulder 747 on the ring 710. The disc 716 also has a radial disc guide flange 24 extending about its circumference to minimize wobbling during movement between open and closed positions.

In this embodiment, the valve disc 716 is secured to the inner end of valve stem 28 by a disc retaining member 718 which has at its outer end an annular back-seat sealing lip 792 providing a generally conical sealing surface 790 on the inner periphery thereof which tapers to a reduced diameter at its outer end. Preferably, the valve disc 716 is formed of a hard, wear-resistant metallic alloy and is secured to the disc retaining member 718 by an electron beam weldment.

The valve chamber 14 is covered by a bonnet assembly having a generally cylindrical bonnet packing cartridge portion 738 with a radially outwardly extending flange and a back-seat portion 780 at its inner end having an outwardly projecting cylindrical portion 782 snugly received in the bore 783 of the bonnet packing cartridge portion 738. Preferably, the back-seat portion 780 is fabricated from a hard, wear-resistant metallic alloy and is welded to the bonnet packing cartridge portion 738 by an electron beam indicated by the rays $f$ to provide an accurately dimensioned, undistorted, strong, fluid-tight assembly. Thus, the axial aperture 784 through the back seat-portion 780 provides a hard, wear-resistant stem guide surface for the valve stem 28.

The back-seat portion 780 is configured to provide a generally conical sealing surface 786 extending circumferentially about its outer periphery which tapers to a reduced diameter at the inner end thereof. The sealing surface 786 adjacent its outer end cooperates with a generally conical surface on the adjacent portion of the inner wall of the valve body 2 defining the valve chamber 14 to provide an annular, wedge-shaped gap therebetween within which an annular float ring seal is seated and forced into tight sealing engagement by fluid pressure in the valve chamber as described earlier with respect to the embodiment of FIGURES 1–5.

When the valve stem 28 is reciprocated outwardly to open the through flow passage 708 as seen in FIGURE 13, the conical sealing surface 790 of the sealing lip 792 of the disc retaining member 718 abuts against the conical surface 786 of the back-seat portion 780 and cooperates therewith to provide a back-seat seal about the valve stem 28. The disc sealing surface 790 has an angle of taper or included angle relative to the axis of valve stem reciprocation normally slightly less than the corresponding angle of taper or included angle of the sealing surface 786 of the back-seat surface 780 and is transversely or radially deflectable within the elastic limit of the material by movement against the back-seat sealing surface 786 to provide stressed fluid-tight sealing engagement therewith. The pressure of fluid against the outer peripheral surface of the sealing lip 792 provides transverse or radially deflecting pressure upon the sealing lip 792 against the back seat portion 780 to enhance the sealing engagement of the sealing surface 790 with the sealing surface 786.

In FIGURE 13, the bonnet assembly has been modified from that of FIGURE 12 by seating the cylindrical portion 782' at the outer end of back-seat portion 780' in a counterbore formed in the inner end of the bonnet packing cartridge portion 738'. In this embodiment, the separate portions are welded by the electron beam indicated by the rays g.

In all of the foregoing embodiments, it can be seen that the bonnet assembly and clamp yoke cooperate to provide a simple but rugged assembly. It will be appreciated that the seal between the valve body and bonnet assembly may be effected by a separate sealing element interposed therebetween or by proper cooperation of surfaces of the body and bonnet assembly per se. The term "annular pressure sealing means between the bonnet assembly and valve body" as used herein is intended to encompass cooperating surfaces on the elements per se and the use of separate seating elements interposed therebetween.

Thus it can be seen that the present invention provides a valve assembly of relatively few components which may be rapidly and conveniently disassembled and assembled for repair and replacement of components and which is rugged in construction. The novel clamp yoke construction readily and securely engages with the valve body and is free from risk of accidental disengagement to ensure firm engagement thereof. The valve also provides a bonnet assembly which enables facile and speedy removal of a bonnet packing cartridge which may be quickly and firmly locked into firm sealing engagement with the valve body; yet the clamp is easily removed to quickly release the bonnet packing cartridge for rapid removal and replacement. Moreover, the novel high-pressure back-seat seal and the readily adjustable and independently removable gland enable the packing to be removed and replaced speedily and easily with the valve in operation without substantial fear of injury.

Having thus described the invention, I claim:

1. A valve assembly including a valve body with a valve chamber communicating with a through flow passage and an externally threaded portion; a clamp yoke outwardly of said valve chamber having an internally threaded clamp portion removably but firmly threadably engaged directly with said externally threaded portion of said valve body; a valve stem mounted in said yoke and reciprocable axially within said valve chamber relative to said clamp yoke; sealing means reciprocable within said chamber by said valve stem for sealing said through flow passage; a bonnet assembly covering the outer end of said valve chamber and including a bonnet packing cartridge portion extending about said valve stem, said bonnet assembly being readily disassemblable from said clamp yoke for facile assembly and disassembly of the valve assembly, said bonnet packing cartridge portion providing an axial aperture about said valve stem opening at the outer end of said bonnet assembly, said bonnet assembly having an end portion extending inwardly of said valve chamber and being firmly engaged by said clamp yoke and being held in locked relationship with said valve body by said clamp yoke, said clamp yoke applying substantially uniform axial pressure about the periphery of said bonnet assembly; annular pressure sealing means between said inwardly extending end portion of said bonnet assembly and the wall of said valve chamber, said wall and bonnet assembly end portion having cooperating, generally conical extending portions at said annular pressure sealing means, said pressure sealing means being disposed within said valve chamber and being subject directly to fluid pressure within said valve chamber during operation of the valve assembly to produce enhanced sealing action; packing means within said axial aperture of said bonnet packing cartridge portion and extending about said valve stem; a gland movable co-axially about said stem outwardly of said packing means; and adjustable means mounted on said yoke and engaged with said gland for adjustable movement of said gland axially of said stem for compressing said packing means within said aperture provided by said bonnet packing cartridge portion, said conical extending portions on said valve chamber wall and body assembly end portion and said threaded engagement of said clamp yoke upon said valve body and said locking engagement of said clamp yoke with said bonnet assembly providing concentricity of said valve body, bonnet assembly and clamp yoke and thereby of said valve stem, flow passage sealing means and gland to eliminate substantially any deflection of said valve stem, said valve assembly being readily assemblable and disassemblable upon disengagement of said clamp portions from said valve body, said gland being readily movable outwardly from said packing means for access to said packing means to permit addition thereto during operation of said valve assembly.

2. The valve assembly of claim 1 wherein said clamp yoke has a split ring portion adjacent the inner end thereof and wherein said clamp yoke has an outer portion outwardly of said valve chamber and intermediate yoke arm portions connecting said split ring portion to said outer portion, said split ring outer and intermediate yoke arm portions being integrally formed said split ring portion having a clamp bolt traversing the split in said split ring portion for drawing the portions of said split ring portion separated by the split tightly together to provide quickly releasable but firm engagement of said clamp yoke upon said valve body said clamp yoke having a radially inwardly extending bonnet retaining flange and said bonnet packing cartridge portion being generally cylindrical with a radially outwardly extending bonnet flange adjacent the outer end thereof, said bonnet retaining flange engaging said bonnet flange to firmly lock said bonnet to said valve body.

3. The valve assembly of claim 1 wherein said adjustable means mounting said gland on said yoke is comprised of a yoke bushing secured to said yoke and having an externally threaded generally cylindrical portion concentric with and extending about said valve stem, said gland having a threaded aperture therein threadably engaged with said threaded cylindrical portion to provide a threadably adjustable movement of said gland relative to the packing means of said bonnet assembly.

4. The valve assembly of claim 3 wherein said gland includes a gland body portion providing the threaded aperture and engaged with said cylindrical portion of said yoke bushing and a separate gland bushing portion with an axial aperture through which said valve stem freely extends, said gland bushing portion being dimensioned to extend within said bonnet assembly axial aperture and disposed against the packing means of said bonnet assembly, said gland bushing portion being rotatable separately from said gland body portion and substantially prevented from rotation by frictional engagement with said packing means.

5. The valve assembly of claim 1 wherein said annular pressure sealing means between said bonnet assembly and said valve body is provided by a depending annular bonnet sealing lip portion on the inwardly extending end portion of said bonnet assembly and a generally conical body sealing surface on the inner wall of said valve body defining said valve chamber, said body sealing surface tapering to a reduced diameter inwardly of the valve chamber, said sealing lip portion having a generally conical sealing surface extending circumferentially about the outer periphery thereof, the angle of taper of said sealing surface of said bonnet sealing lip portion relative to the axis of valve stem reciprocation being normally slightly less than the corresponding angle of taper of said body sealing surface, said bonnet sealing lip portion being transversely deflectable upon movement of said bonnet assembly against said body sealing surface into stressed fluid-tight sealing engagement with said body sealing surface, the bonnet sealing lip portion being transversely deflectable against said body sealing surface by fluid pressure against the inner peripheral surface thereof to enhance the sealing engagement of said bonnet sealing lip portion and said body sealing surface.

6. The valve assembly of claim 5 wherein said bonnet assembly is comprised of a metallic element providing said bonnet packing cartridge portion and a separate element of hard, wear-resistant metallic alloy providing said bonnet sealing lip portion, said elements being firmly bonded together by a weldment extending about the periphery thereof.

7. The valve assembly of claim 1 wherein said annular pressure sealing means between said bonnet assembly and said valve body is provided by a generally conical body sealing surface on the inner wall of said valve body defining said valve chamber, a generally conical bonnet sealing surface extending circumferentially about said bonnet assembly adjacent the inner end thereof, said sealing surfaces tapering to a reduced diameter inwardly of said valve chamber and said bonnet sealing surface having an angle of taper relative to the axis of valve stem reciprocation normally greater than the corresponding angle of taper of said body sealing surface to provide an annular gap therebetween diverging inwardly of said valve chamber, and an annular float ring seal in the diverging gap between said sealing surfaces, said float ring seal being wedged and compressed in said gap during movement of said bonnet assembly inwardly of said valve chamber, fluid pressure within said valve chamber during operation of the valve tending to force said float ring seal into said gap to provide an annular pressure seal between said bonnet assembly and said valve body.

8. A valve assembly including a valve body with a valve chamber communicating with a through flow passage and an externally threaded portion; a clamp yoke outwardly of said valve chamber having an internally threaded split ring portion adjacent the lower end thereof in threaded engagement with the externally threaded portion of said valve body, an outer portion and intermediate arm portions connecting said split ring portion to said outer portion, the said split ring, outer and intermediate arm portions being integrally formed said split ring portion having a clamp bolt traversing the split in said split ring portion for drawing the portions of said split ring portion separated by the split tightly together to provide quickly releasable but firm engagement of said clamp yoke upon said valve body, said clamp yoke having a radially inwardly extending bonnet retaining flange intermediate its length; a bonnet assembly covering the outer end of said valve chamber and having an inner end portion extending thereinto and a bonnet packing cartridge portion adjacent the outer end thereof with an axial aperture therein opening at the outer end thereof, said bonnet packing cartridge portion having a radially outwardly extending bonnet flange adjacent the outer end thereof engaged by said bonnet retaining flange of said clamp yoke to firmly lock said bonnet assembly to said valve body, said clamp yoke applying substantially uniform axial pressure about the periphery of said bonnet assembly, said bonnet assembly being readily disassemblable from said clamp yoke for facile assembly and disassembly of said valve assembly a valve stem extending through said bonnet assembly and reciprocable axially within said valve chamber relative to said clamp yoke; sealing means reciprocable within said chamber by said valve stem for sealing said through flow passage; annular pressure sealing means between said bonnet assembly inner end portion and the wall of said valve chamber, said wall and inner end portion having cooperating generally conical surfaces at said pressure sealing means said pressure sealing means being disposed within said valve chamber and being subject directly to fluid pressure within said valve chamber during operation of the valve assembly to produce enhanced sealing action packing means within said axial aperture of said bonnet packing cartridge portion and extending about said valve stem; a gland coaxially movable about said valve stem outwardly of said packing means; and adjustable means mounted on said yoke and engaged with said gland for adjustable movement of said gland axially of said stem for compressing said packing means within said bonnet packing cartridge portion about said valve stem said conical surfaces of said inner end portion and said valve chamber and said threaded engagement of said clamp yoke upon said valve body and said locking engagement of said clamp yoke with said bonnet assembly providing concentricity of said valve body, bonnet assembly and clamp yoke and thereby of said valve stem, flow passage sealing means and gland to eliminate substantially any deflection of said valve stem, said valve assembly being readily assemblable and disassemblable upon disengagement of said clamp portion from said valve body, said gland being readily movable outwardly from said packing means for access to said packing means to permit addition thereto during operation of said valve assembly.

9. The valve assembly of claim 8 wherein said annular pressure sealing means between said bonnet assembly inner end portion and said valve body is provided by a depending annular bonnet sealing lip portion on the inner end of said bonnet assembly and a generally conical body sealing surface on the inner wall of said valve body defining said valve chamber, said body sealing surface tapering to a reduced diameter inwardly of the valve chamber, said sealing lip portion having a generally conical sealing surface extending circumferentially about the outer periphery thereof, the angle of taper of said sealing surface of said bonnet sealing lip portion relative to the axis of valve stem reciprocation being normally slightly less than the corresponding angle of taper of said body sealing surface, said bonnet sealing lip portion being transversely deflectable upon movement of said bonnet assembly against said body sealing surface into stressed, fluid-tight sealing engagement with said body sealing surface, the bonnet sealing lip portion being transversely deflectable against said body sealing surface by fluid pressure acting against the inner peripheral surface thereof to enhance the sealing engagement of said bonnet sealing lip portion and said body sealing surface.

10. A valve assembly including a valve body with a valve chamber communicating with a through flow passage and an externally threaded portion; a clamp yoke outwardly of said valve chamber having an internally threaded split ring portion adjacent the lower end thereof in threaded engagement with said externally threaded portion of said valve body, an outer portion and intermediate arm portions connecting said split ring portion to said outer portion, said split ring outer and intermediate arm portions being integrally formed said split ring portion having a clamp bolt traversing the split in said split ring portion for drawing the portions of said split ring portion separated by the split tightly together to provide quickly releasable but firm engagement of said clamp yoke upon said valve body, said clamp yoke having a radially inwardly extending bonnet retaining flange intermediate its length; a bonnet assembly covering the outer end of said valve chamber and having an inner portion extending thereinto and a bonnet packing cartridge portion adjacent the outer end thereof with an axial aperture therein opening at the outer end thereof, said bonnet packing cartridge portion having a radially outwardly extending bonnet flange adjacent the outer end thereof engaged by said bonnet retaining flange of said clamp yoke to firmly lock said bonnet assembly to said valve body, said clamp yoke applying substantially uniform axial pressure about the periphery of said bonnet assembly, said bonnet assembly being readily disassemblable from said clamp yoke for facile assembly and disassembly of the valve assembly, said bonnet assembly having a depending annular bonnet sealing lip portion on the inner end portion thereof with a generally conical sealing surface extending circumferentially about the outer periphery thereof and tapering to a reduced diameter inwardly of said valve chamber, the inner wall of said body defining said valve chamber having a generally conical body sealing surface cooperating with the sealing surface of said bonnet sealing lip portion, the angle of taper of said sealing surface of said bonnet sealing lip portion relative to the axis of valve stem reciprocation being normally slightly less than the corresponding angle of taper of said body sealing surface, said bonnet sealing lip portion being transversely deflectable upon movement of said bonnet assembly against said body sealing surface into stressed fluid-tight sealing engagement with said body sealing surface, the bonnet sealing lip portion being transversely deflectable against said body sealing surface by fluid pressure acting against the inner peripheral surface thereof to enhance the sealing engagement of said bonnet sealing lip portion and said body sealing surface; a yoke bushing secured in the outer portion of said clamp yoke and having an externally threaded generally cylindrical portion extending towards said bonnet assembly; a valve stem extending through said bonnet assembly and yoke bushing and reciprocable axially within said valve chamber relative to said clamp yoke; sealing means reciprocable within said chamber by said valve stem for sealing said through flow passage; packing means within said axial aperture of said bonnet packing cartridge portion and extending about said valve stem; and a gland having an axial aperture therethrough movable coaxially about said valve stem outwardly of said packing means, said gland aperture having a threaded portion threadably engaged with said threaded cylindrical portion of said yoke bushing to provide threadably adjustable movement of said gland relative to the packing means of said bonnet assembly, and said gland having a generally cylindrical portion at the inner end thereof extending within said axial aperture of said cartridge packing portion to compress the packing material therein about said valve stem, said conical sealing surfaces of said bonnet sealing lip portion and said body inner wall and said threaded engagement of said clamp yoke upon said valve body and said locking engagement of said clamp yoke with said bonnet assembly providing concentricity of said valve body, bonnet assembly and clamp yoke and thereby of said valve stem, flow passage sealing means and gland to eliminate substantially any deflection of said valve stem, said valve assembly being readily assemblable and disassemblable upon disengagement of said clamp portion from said valve body, said gland being readily movable outwardly from said packing means for access to said packing means to permit addition thereto during operation of said valve assembly.

11. A valve assembly including a valve body with a valve chamber communicating with a through flow passage and an externally threaded portion; a clamp yoke outwardly of said valve chamber having an internally threaded split ring portion adjacent the lower end thereof in threaded engagement with the externally threaded portion of said valve body, an outer portion and intermediate arm portions connecting said split ring portion to said outer portion, said split ring outer and intermediate arm portions being integrally formed said split ring portion having a clamp bolt traversing the split in said split ring portion for drawing the portions of said split ring portion separated by the split tightly together to provide quickly releasable but firm engagement of said clamp yoke upon said valve body, said clamp yoke having a radially inwardly extending bonnet retaining flange intermediate its length; a bonnet assembly covering the outer end of said valve chamber and having an inner end portion extending thereinto and a bonnet packing cartridge portion adjacent the outer end thereof with an axial aperture therein opening at the outer end thereof, said bonnet packing cartridge portion having a radially outwardly extending bonnet flange adjacent the outer end thereof engaged by said bonnet retaining flange of said clamp yoke to firmly lock said bonnet assembly to said valve body, said clamp yoke applying substantially uniform axial pressure about the periphery of said bonnet assembly, said bonnet assembly being readily disassemblable from said clamp yoke for facile assembly and disassembly of said valve assembly, said bonnet assembly having a back-seat portion at the inner end thereof, said back seat portion having a circumferentially extending generally conical sealing surface portion tapering to a reduced diameter inwardly of said valve chamber; annular pressure sealing means between said inner end portion of said bonnet assembly and the wall of said valve chamber, said wall and bonnet assembly inner end portion having cooperating generally conical extending portions at said annular pressure sealing means, said pressure sealing means being disposed within said valve chamber and being subject directly to fluid pressure within said valve chamber during operation of the valve assembly to produce enhanced sealing action; a yoke bushing secured in the outer portion of said clamp yoke and having an externally threaded generally cylindrical portion extending towards said bonnet assembly; a valve stem extending through said bonnet assembly and yoke bushing and reciprocable axially within said valve chamber relative to said clamp yoke; sealing means reciprocable within said chamber by said valve stem for sealing said through flow passage, said sealing means having an annular back-seat sealing lip portion at the outer end thereof concentrically disposed about said valve stem and extending towards the bonnet assembly, the inner periphery of said sealing lip portion having a generally conical circumferentially extending back-seat surface portion opening towards said bonnet assembly, said conical sealing surface portion of said back seat sealing lip portion having an angle of taper relative to the axis of valve stem reciprocation normally slightly less than the corresponding angle of taper of said back seat portion sealing surface portion of said bonnet assembly, said sealing lip portion being transversely deflectable upon movement of said sealing means against said back-seat portion into stressed fluid-tight sealing engagement with said back-seat sealing surface portion, said sealing lip portion being transversely deflectable against said back seat portion by fluid pressure about the outer periphery thereof to enhance sealing engagement of said back-seat portion and sealing lip portion; packing means within said aixal aperture of said bonnet packing cartridge portion and extending about said valve stem; and a gland having an axial aperture therethrough movable coaxially about said valve stem outwardly of said packing means, said gland aperture having a threaded portion therein threadably engaged with said threaded cylindrical portion to provide threadably adjustable movement of said gland relative to the packing means of said bonnet assembly, and said gland having a generally cylindrical portion at the lower end thereof extending within said axial aperture of said cartridge portion to compress the packing material about said valve stem said conical extending portions on said valve chamber wall and body assembly end portion and said threaded engagement of said clamp yoke upon said valve body and said locking engagement of said clamp yoke with said bonnet assembly providing concentricity of said valve body, bonnet assembly and clamp yoke and thereby of said valve stem, flow passage sealing means and gland to eliminate substantially any deflection of said valve stem, said valve assembly being readily assemblable and disassemblable upon disengagement of said clamp portion from said valve body, said gland being readily movable outwardly from said packing means for access to said packing means to permit addition thereto during operation of said valve assembly.

12. A valve assembly including a valve body with a valve chamber communicating with a through flow passage and an externally threaded portion; a clamp yoke outwardly of said valve chamber having an internally threaded split ring portion adjacent the lower end thereof in threaded engagement with said externally threaded portion of said valve body, an outer portion and intermediate arm portions connecting said split ring portion to said outer portion, said split ring outer and intermediate arm portions being integrally formed said split ring portion having a clamp bolt traversing the split in said split ring portion for drawing the portions of said split ring portion separated by the split tightly together to provide quickly releasable but firm engagement of said clamp yoke upon said valve body, said clamp yoke having a radially inwardly extending bonnet retaining flange intermediate its length; a bonnet assembly covering the outer end of said valve chamber and having an inner end portion extending thereinto and a bonnet packing cartridge portion adjacent the outer end thereof with an axial aperture therein opening at the outer end thereof, said bonnet packing cartridge portion having a radially outwardly extending bonnet flange adjacent the outer end thereof engaged by said bonnet retaining flange of said clamp yoke to firmly lock said bonnet assembly to said valve body, said clamp yoke applying substantially uniform axial pressure about the periphery of said bonnet assembly, said bonnet assembly being readily disassemblable from said clamp yoke for facile assembly and disassembly of said valve assembly, said bonnet assembly having a metallic element providing said bonnet packing cartridge portion and a separately formed element of a hard, wear-resistant metallic alloy at the inner end thereof and secured to said bonnet packing cartridge portion by a weldment extending about the periphery thereof, said wear-resistant metallic alloy element having a depending annular bonnet sealing lip portion extending circumferentially thereabout with a generally conical sealing surface extending circumferentially about the outer periphery thereof and tapering to a reduced diameter inwardly of said valve chamber, the inner wall of said valve body defining said valve chamber having a generally conical body sealing surface cooperating with the sealing surface of said bonnet sealing lip portion, the angle of taper of said sealing surface of said bonnet sealing lip portion relative to the axis of valve stem reciprocation being normally slightly less than the corresponding angle of taper of said body sealing surface, said bonnet sealing lip portion being transversely deflectable upon movement of said bonnet assembly against said body sealing surface by fluid pressure acting against the gagement with said body sealing surface, the bonnet sealing lip portion being transversely deflectable against said body sealing surface by fluid pressure acting against the inner peripheral surface thereof to enhance the sealing engagement of said bonnet sealing lip portion and said body sealing surface, said wear-resistant metallic alloy element having a back seat portion at the inner end thereof, said back seat portion having a circumferentially extending generally conical sealing surface portion tapering to a reduced diameter inwardly of said valve chamber; a yoke bushing secured in the outer portion of said clamp yoke and having an externally threaded generally cylindrical portion extending towards said bonnet assembly; a valve stem extending through said bonnet assembly and yoke bushing and reciprocable axially within said valve chamber relative to said clamp yoke; sealing means reciprocable within said chamber by said valve stem for sealing said through flow passage, said sealing means having a back-seat sealing lip portion at the outer end thereof concentrically disposed about said valve stem and extending towards said bonnet assembly, the inner periphery of said sealing lip portion having a generally conical circumferentially extending back seat surface portion opening towards said bonnet assembly, said conical sealing surface portion of said back seat sealing lip portion having an angle of taper relative to the axis of valve stem reciprocation normally slightly less than the corresponding angle of taper of said back seat sealing surface portion of said bonnet assembly, said sealing lip portion being transversely deflectable upon movement of said sealing means against said back seat portion into stressed, fluid-tight sealing engagement with said back seat sealing surface portion, said sealing lip portion being transversely deflectable against said back seat portion by fluid pressure acting about the outer periphery thereof to enhance sealing engagement of said back seat portion and sealing lip portion; packing means within said axial aperture of said bonnet packing cartridge portion and extending about said valve stem; and a gland having an axial aperture therethrough movable coaxially on said valve stem outwardly of said packing means, said gland aperture having a threaded portion therein threadably engaged with said threaded cylindrical portion to provide threadably adjustable movement of said gland relative to the packing means of said bonnet assembly, and said gland having a generally cylindrical portion at the lower end thereof extending within said axial aperture of said cartridge portion to compress the packing material about said valve stem said conical extending portions on said valve chamber wall and body assembly end portion and said threaded engagement of said clamp yoke upon said valve body and said locking engagement of said clamp yoke with said bonnet assembly providing concentricity of said valve body, bonnet assembly and clamp yoke and thereby of said valve stem, flow passage sealing means and gland to eliminate substantially any deflection of said valve stem, said valve assembly being readily assemblable and disassemblable upon disengagement of said clamp portion from said valve body, said gland being readily movable outwardly from said packing means for access to said packing means to permit addition thereto during operation of said valve assembly.

13. In a valve, the combination comprising a valve body with a valve chamber communicating with a through flow passage and an externally threaded portion; a clamp yoke outwardly of said valve chamber having an internally threaded split ring portion adjacent the lower end thereof in threaded engagement with said externally threaded portion of said valve body, an outer portion and intermediate arm portions connecting said split ring portion to said outer portion, said split ring outer and intermediate arm portions being integrally formed, said split ring portion having a clamp bolt traversing the split in said split ring portion for drawing the portions of said split ring portion separated by the split tightly together to provide quickly releasable but firm engagement of said clamp yoke upon said valve body, said clamp yoke having a radially inwardly extending bonnet retaining flange intermediate its length; a bonnet assembly covering the outer end of said valve chamber and having an inner end portion extending thereinto and a bonnet packing cartridge portion adjacent the outer end thereof with an axial aperture therein opening at the outer end thereof, said bonnet packing cartridge portion having a radially outwardly extending bonnet flange adjacent the outer end thereof engaged by said bonnet retaining flange of said clamp yoke to firmly lock said bonnet assembly to said valve body, said bonnet assembly being readily disassemblable from said clamp yoke for facile assembly and disassembly of said valve assembly, and annular pressure sealing means between said inner end portion of said bonnet assembly and the wall of said valve chamber, said valve chamber wall and inner end portion having cooperating, generally conical extending sealing surfaces at said pressure sealing means, said pressure sealing means being disposed within said valve chamber and being subject directly to fluid pressure within said valve chamber during operation of said valve assembly to produce enhanced sealing action, said conical sealing surfaces on said bonnet assembly and valve body wall and said threaded engagement of said clamp yoke upon said valve body and said locking engagement of said clamp yoke with said bonnet assembly providing concentricity of said bonnet assembly and clamp yoke and thereby of an associated valve stem through flow passage sealing means carried thereby to eliminate substantially any deflection of the valve stem, said valve assembly being readily assemblable and disassemblable upon disengagement of said clamp from said valve body.

References Cited by the Examiner
UNITED STATES PATENTS

| | | | |
|---|---|---|---|
| 1,175,258 | 3/1916 | Hamilton | 251—214 XR |
| 1,717,859 | 6/1929 | Thorne | 251—329 |
| 2,582,996 | 1/1952 | Laurent | 251—329 X |
| 2,596,681 | 5/1952 | Hammon | 251—214 |
| 2,880,903 | 4/1959 | Nehls | 220—46 |
| 2,982,514 | 5/1961 | Bryant | 251—329 |
| 3,006,500 | 10/1961 | Gulick | 220—46 |
| 3,033,517 | 5/1962 | Rovang et al. | 251—214 |
| 3,071,342 | 1/1963 | Allen | 251—214 X |

FOREIGN PATENTS

| | | |
|---|---|---|
| 202,945 | 8/1956 | Australia. |
| 574,752 | 4/1959 | Canada. |

ISADOR WEIL, *Primary Examiner.*